United States Patent [19]

Kaminski et al.

[11] 3,767,995

[45] Oct. 23, 1973

[54] AUTOMATIC BATTERY CHARGING CIRCUIT OPERABLE OVER A WIDE TEMPERATURE RANGE

[75] Inventors: Philip G. Kaminski, Sunrise; Brian H. Moisand, Plantation; Bruce M. Stone, Pompano Beach, all of Fla.

[73] Assignee: Motorola, Inc., Franklin Park, Ill.

[22] Filed: May 17, 1972

[21] Appl. No.: 254,212

[52] U.S. Cl. ..................... 320/22, 320/32, 320/35, 320/39
[51] Int. Cl. .............................................. H02j 7/14
[58] Field of Search .................. 320/22, 32, 33, 35, 320/36, 39, 40, 23, 24

[56] References Cited
UNITED STATES PATENTS

| | | | |
|---|---|---|---|
| 3,652,915 | 3/1972 | Eberts | 320/39 X |
| 3,579,076 | 5/1971 | Herbst et al. | 320/36 |
| 3,599,071 | 8/1971 | Lapuyade et al. | 320/22 X |

*Primary Examiner*—J. D. Miller
*Assistant Examiner*—Robert J. Hickey
*Attorney*—Vincent J. Rauner et al.

[57] ABSTRACT

An automatic battery charging and voltage regulating system for connection between a source of voltage and a battery to be charged which battery may have current consuming equipment connected thereto and may have a thermistor attached thereon whose resistance varies in accordance with battery temperature. The system includes a converter coupled to the source of voltage which develops a charging voltage for charging the battery, a current control circuit is coupled to the converter and to the battery and operates to limit the maximum charging current to the battery to a first level if there is no thermistor or if the thermistor resistance exceeds a predetermined amount, and to the second level, if the thermistor resistance is below the predetermined amount. A voltage sensing circuit is also provided which senses the battery voltage in excess of a predetermined level and reduces the charging voltage developed by the converter.

A first circuit may also be provided which upon actuation of the current consuming equipment causes the current control circuit to limit the charging current to the first higher maximum charging current.

21 Claims, 2 Drawing Figures

PATENTED OCT 23 1973

AUTOMATIC BATTERY CHARGING CIRCUIT OPERABLE OVER A WIDE TEMPERATURE RANGE

BACKGROUND

Many known methods and apparatus for charging electric batteries involve excessively long periods of time for charging the batteries. When attempts are made to shorten the charging time, that is, rapidly charge the battery, particularly in charging nickel cadmium batteries, excessive gas generation and temperature increase occur in the battery. This gas generation and temperature increase could easily cause distortion or rupture of the battery and even an explosion.

Attempts have, however, been made to charge such batteries in shorter periods of time. One rapid charging circuit provides a high charging current to a battery until the battery voltage exceeds a predetermined level. The charging current is then reduced to a level which maintains the battery charge capacity. In such a system, the predetermined voltage level may be reached when the battery has only attained 70 to 80 percent of its charge capacity. In addition, under certain circumstances the battery can reach this predetermined voltage level substantially after gassing and excessive temperature have occurred which could cause damage to the battery.

Another system provides a high charging voltage to a battery and senses increase in battery temperature. When the temperature increases beyond the predetermined level, the charging voltage or current is reduced so as to prevent further temperature rise and gassing in the battery. Since the generation of heat in the battery cells begins when the battery has reached full charge capacity, sensing temperature insures full charge capacity. The predetermined temperature may not be reached, however, if the initial battery temperature or the charger's ambient temperature is cold.

Still another system senses the battery temperature and voltage and combines the two sensed signals to produce a reduction in charging voltage to the battery. In this system, the combining of the temperature sensing characteristics with the voltage can reduce the charging voltage to a point which would prevent the battery from reaching its full charge capacity. The combining of these two characteristics may allow the continuation of a charging current at a rate which allows a continued gassing and temperature increase of the battery.

In all such systems, should the battery be in the equipment to be operated, and should the charging current be reduced to a point which would not cause a temperature rise or gassing in the battery, operation of the external equipment would draw current from the battery, thus reducing its charge capacity.

SUMMARY OF THE INVENTION

It is, therefore, an object of this invention to provide an automatic rapid battery charging system capable of charging certain batteries to their full charge capacity in a shortened period of time.

Another object of this invention is to provide a battery charging system which when used with batteries having thermistors attached thereto senses an increase in battery temperature and limits the maximum charging current to a safe level in accordance with the battery temperature.

Yet another object of this invention is to provide an automatic battery charging system which senses the voltage of the battery and controls the charging voltage in accordance therewith, independent of the current control produced by the temperature sensing circuit.

Still another object of this invention is to provide an automatic battery charging system which upon actuation of the current consuming equipment attached to the battery while being charged, will supply current to the equipment so as to prevent a reduction in charge capacity of the battery being charged.

In practicing this invention, an automatic battery charging and voltage regulating system is provided for connection between a source of voltage and a battery to be charged. The battery may have current consuming equipment connected thereto, and may have a temperature responsive device attached thereon having a first state in response to a battery temperature below a first level and a second state in response to a battery temperature above the first level.

This system includes a converter connected to a source of voltage which develops the charging voltage for charging the battery. A transistorized current limiter circuit is coupled to the converter and to the battery. The current limiter supplies a charging current to the battery in response to the charging voltage from the converter. This current limiter operates to limit the charging current to a first maximum charging current in response to a first control signal coupled thereto, and to a second lower maximum charging current in response to a second control signal.

A control circuit is coupled to the current limiter and to the battery. This control circuit develops the first control signal in response to the temperature responsive device being in the first state, and develops the second control signal in response to the absence of the temperature responsive device or the temperature responsive device being in the second state.

A voltage sensing circuit is coupled to the battery and to the converter. The voltage sensing circuit senses a battery voltage in excess of a predetermined level and causes a reduction in the charging voltage developed by the converter, which in turn causes a reduction in the charging current supplied to the battery.

A diode coupled to the control circuit and the current consuming equipment is operative upon actuation of the current consuming equipment to cause the control circuit to maintain or develop the first control signal whereby the first higher maximum charging current may be supplied to the power consuming equipment thus preventing a reduction in the charge capacity of the battery being charged.

THE DRAWINGS

DETAILED DESCRIPTION

Figure 1:
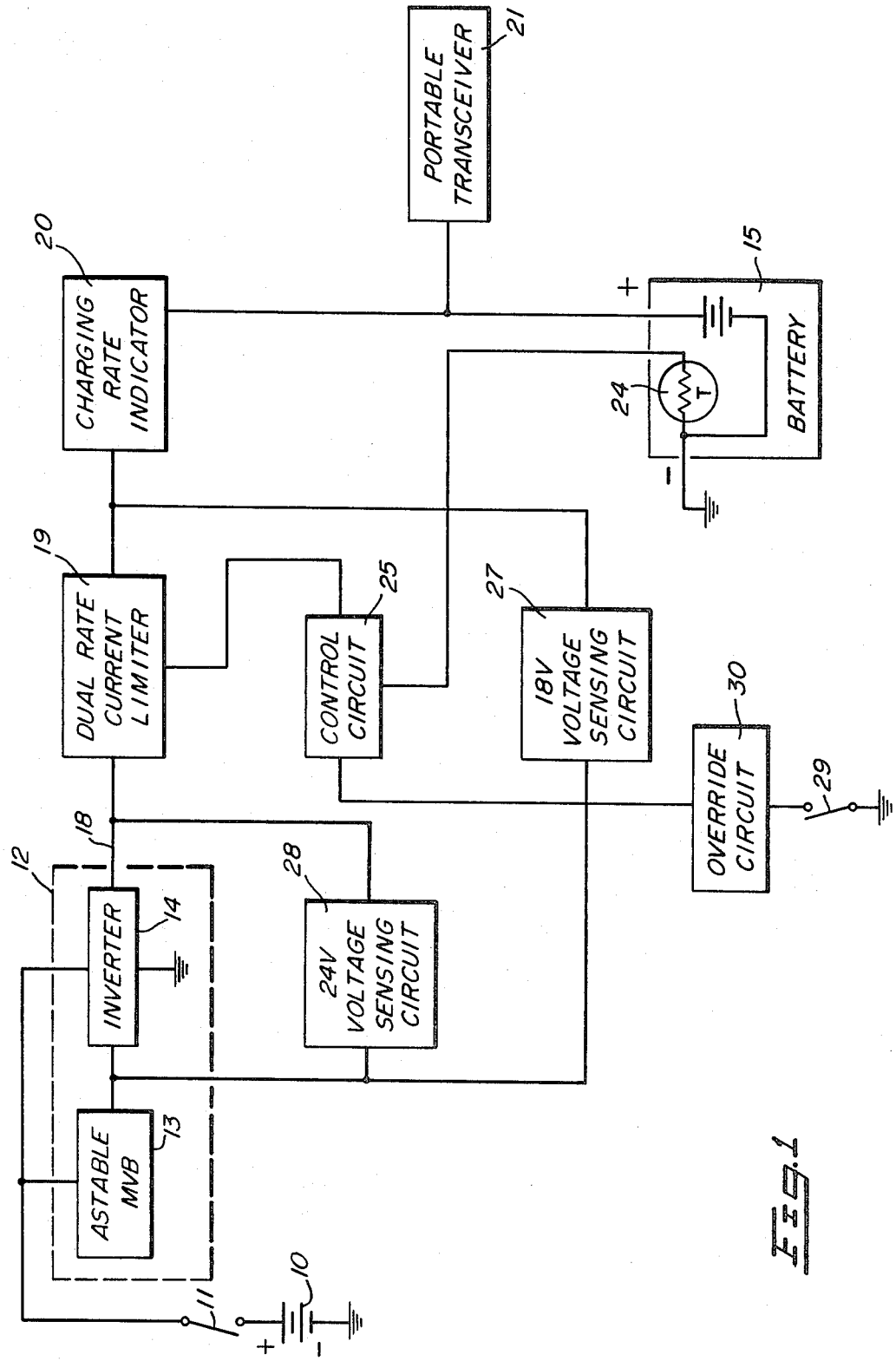
FIG. 1 is a block diagram of an automatic battery charging and voltage regulating system incorporating the features of this invention.

Referring now to FIG. 1, the charging system is connected to a source of voltage which may as is shown in this embodiment be a car battery 10. Battery 15, the battery to be charged in the embodiment shown, is a 15 volt battery. The voltage of this battery may vary to as high as 18, and as low as 11 volts. Because the charging system in the embodiment shown is to operate in an automobile where the auto battery is generally 12 volts, a converter 12 must be used in order to generate a voltage great enough to cause charging of battery 15. It is to be understood, however, that this system is not to be limited to a charger operable in an automobile, and employing a converter. It should be apparent to those skilled in the art that car battery 10 may be replaced by a source of AC power, and converter 12 may be replaced by a full or half-wave bridge rectifier circuit with the rectifier diodes being replaced with silicon controlled rectifiers (SCR's) in the event that control of the charging voltage is desired. Additionally, should a source of voltage such as car battery 10 have a terminal voltage, which is sufficiently greater than the voltage of the battery to be charged so that a sufficient charging voltage is always present, converter 12 can be entirely eliminated.

Converter 12 includes an astable multivibrator 13 which is connected through on-off switch 11 to carry battery 10, and an inverter 14 which is connected to astable multivibrator 13, and to car battery 10 through switch 11. In the embodiment shown, the charging voltage developed on line 18 by converter 12 is approximately 24 volts.

The charging voltage on conductor 18 is coupled to dual rate current limiter 19. Dual rate current limiter 19 is operative to limit the maximum current coupled therethrough to a first maximum charging current in response to a first control signal, and to a second lower maximum charging current in response to a second control signal. The charging current from dual rate limiter 19 is coupled through charging rate indicator circuit 20 to battery 15, and to current consuming equipment which may be attached to battery 15, such as a portable transceiver shown at 21.

Battery 15 may be a standard nickel-cadmium rechargeable battery which must be recharged at a normal slow charging rate, or it may be what is referred to as a rapid charge battery. In a rapid charge battery, a temperature responsive device 24, is physically secured to the nickel-cadmium battery cells. In the embodiment shown, temperature responsive device 24 is a thermistor. The characteristics of thermistor 24 are such that its resistance will increase with an increase in the ambient temperature. In this case the ambient temperature is the temperature of battery 15.

A current control circuit 25 is coupled to dual rate current limiter 19 and thermistor 24 on battery 15, if thermistor 24 is present. Current control circuit 25 will develop a first control signal if the resistance of thermistor 24 corresponds to a battery temperature less than a first predetermined level. Current control circuit 25 will develop the second control signal if thermistor 24 is not present, as for example in an ordinary nickel cadmium battery, or should the resistance of thermistor 24 indicate a battery temperature greater than the first predetermined level.

A voltage sensing circuit 27 is coupled to the output of dual rate current limiter 19 and to converter 12. Voltage sensing circuit 27 senses an increase in the voltage of battery 15. When the voltage developed across battery 15 exceeds 18 volts, voltage sensing circuit 27 operates to cause a reduction in charging voltage developed by converter 12, thereby limiting the maximum charging voltage and current applied to battery 15.

A second voltage sensing circuit 28 is responsive to an increase in voltage at the output of converter 12 over 24 volts to cause a reduction in the charging voltage developed by converter 12 such that the voltage on conductor 18 is maintained at 24 volts. A 24 volt maximum voltage on line 18 is necessary for efficient operation of inverter 14. Sensing circuit 28 improves the efficiency of inverter 14 by reducing the drive current thereto when low current is supplied to battery 15.

Should a portable transceiver 21 be actuated while connected to battery 15 and the charging system, as for example, by actuation of push-to-talk switch 29, it will cause operation of an override circuit 30 connected from push-to-tall switch 29 to current control circuit 25. This override circuit will cause current control circuit 25 to develop the first control signal whereby dual rate current limiter 19 is operative to supply the first maximum charging current to said battery 15 and portable transceiver 21 through charging rate indicator 20. This will prevent reduction in charge capacity of battery 15 by operation of portable transceiver 21.

Charging rate indicator circuit 20 coupled between dual rate current limiter 19 and battery 15 senses the current being supplied to battery 15. If the current supplied exceeds the second lower maximum charging current, charge rate indicator circuit 20 may supply an indication, either visual or via a contact closure to the user.

Figure 2:
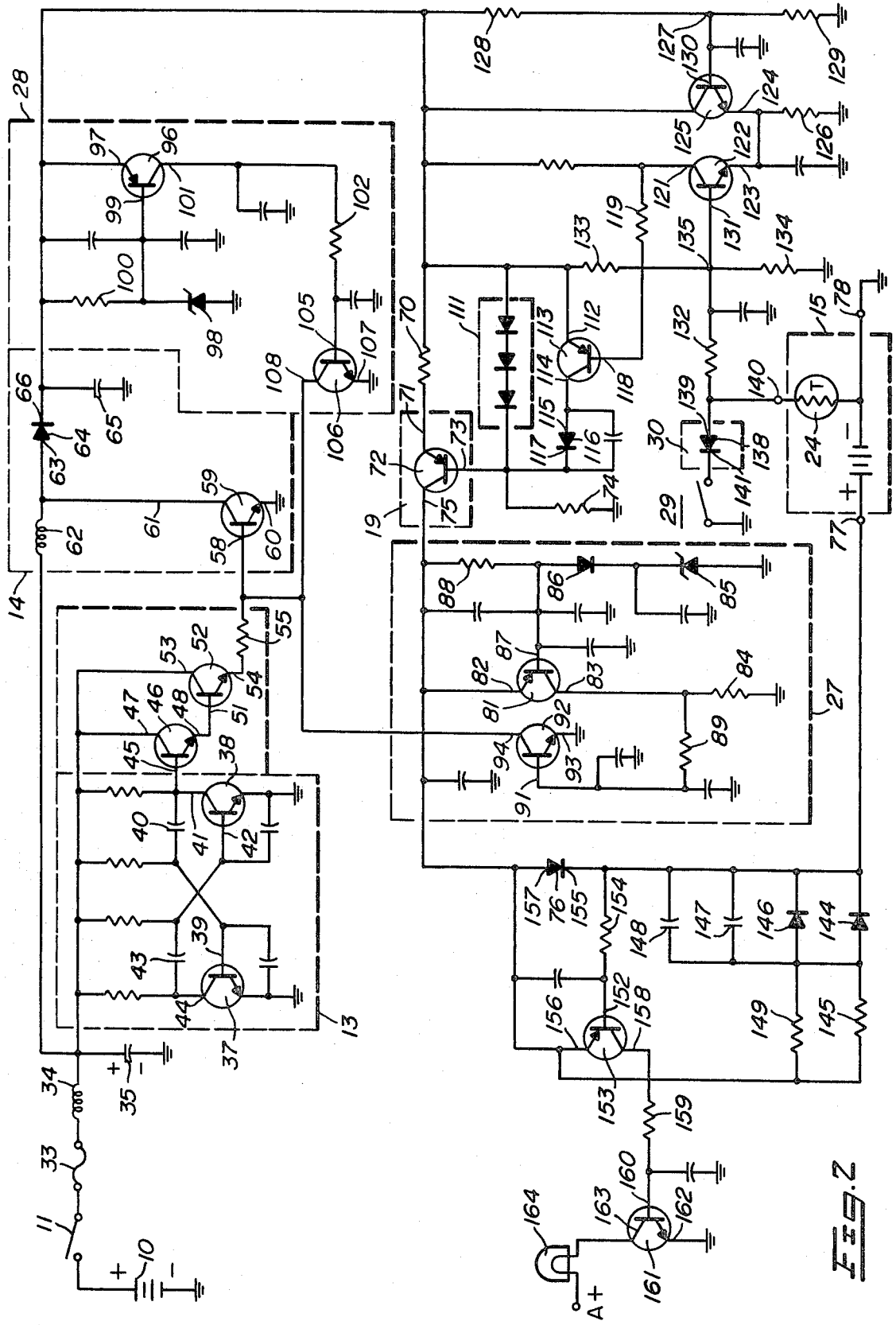
FIG. 2 is a schematic diagram of one form of an automatic battery charging and voltage regulating system incorporating the features of this invention.

Referring now to FIG. 2, battery 10 is shown connected through switch 11, fuse 33, and inductor 34 to astable multivibrator 13. Capacitor 35 is connected between inductor 34 and ground potential. Inductor 34 and capacitor 35 act to smooth the DC voltage supplied from battery 10, and to prevent any voltage spikes from being coupled to the charger such as may be produced by the automobile generator.

Astable multivibrator 13 includes a first transistor 37, and a second transistor 38. Base electrode 39 of transistor 37 is coupled through capacitor 40 to collector electrode 41 of transistor 38 and base electrode 42 of transistor 38 is coupled through capacitor 43 to collector electrode 44 of transistor 37. The remaining connections of astable multivibrator 13 are commonly known in the art and need not be further described. Collector electrode 41 of transistor 38 is coupled to base electrode 45 of transistor 46, collector electrode 47 of transistor 46 is coupled to the source voltage at inductor 34. Emitter electrode 48 of transistor 46 is coupled to base electrode 51 of transistor 52. Transistors 46 and 52 comprise a Darlington connected current amplifier. Collector 53 of transistor 52 is coupled to the source voltage at inductor 34, and emitter 54 of transistor 52 is coupled through resistor 55 to base electrode 58 of transistor 59. Emitter electrode 60 of transistor 59 is coupled to ground potential, and collector electrode 61 is coupled through inductor 62 to the source voltage at inductor 34. Anode 63 of diode 64 is coupled to collector 61 of transistor 59, and capacitor 65 is coupled between cathode 66 of diode 64 and ground potential. Transistor 59, inductor 62, diode 64 and capacitor 65 form inverter 14. The charging voltage of 24 volts is developed at cathode 66 of diode 64.

Cathode 66 of diode 64 is coupled through resistor 70 to emitter 71 of transistor 72. Base 73 of transistor 72 is connected through resistor 74 to ground potential. Collector electrode 75 of transistor 72 is connected through diode 76, which will be explained in greater detail in a subsequent portion of this application, to positive terminal 77 of battery 15. Transistor 72 is dual rate current limiter 19, and acts to provide the charging current for battery 15. Negative terminal 78 of battery 15 is coupled to ground potential to complete the current loop from battery 10 through the charging circuit and through battery 15.

Voltage sensing circuit 27 includes a transistor 81, having an emitter electrode 82 coupled to collector electrode 75 of transistor 72, and a collector electrode 83, connected through resistor 84 to ground potential. A zener diode 85 has one terminal coupled to ground potential and a second terminal coupled through diode 86 to base electrode 87 of transistor 81. Base electrode 87 is also coupled through resistor 88 to collector electrode 75 of transistor 72. Zener diode 85, diode 86 and resistor 88 form a voltage divider which supplies a reference potential to base electrode 87 of transistor 81. Collector electrode 83 of transistor 81 is coupled through resistor 89 to base electrode 91 of transistor 92. Emitter electrode 93 of transistor 92 is coupled to ground potential, and collector electrode 94 of transistor 92 is coupled to base electrode 58 of transistor 59 in inverter 14.

Second voltage sensing circuit 28 includes transistor 96. Emitter electrode 97 of transistor 96 is connected to cathode 66 of diode 64. Zener diode 98 has a first terminal coupled to ground potential and a second terminal coupled to base electrode 99 of transistor 96. Base electrode 99 of transistor 97 is also coupled through resistor 100 to cathode 66 of diode 64. Resistor 100 and zener diode 98 form a voltage divider which provides a reference potential to base electrode 99 of transistor 96. Collector electrode 101 of transistor 96 is coupled through resistor 102 to base electrode 105 of transistor 106. Emitter electrode 107 of transistor 106 is coupled to ground potential, and collector electrode 108 is coupled to base electrode 58 of transistor 59 in inverter 14.

Current control circuit 25 includes three diodes, collectively identified by the reference number 111, connected from cathode 66 of diode 64 to base electrode 73 of transistor 72. Emitter 112 of transistor 113 is connected to cathode 66 of diode 64, and collector 114 of transistor 113 is connected to anode 115 of diode 116. Cathode 117 of diode 116 is connected to base electrode 73 of transistor 72. Base electrode 118 of transistor 113 is coupled through resistor 119 to collector electrode 121 of transistor 122, emitter electrode 123 of transistor 122 is coupled to emitter electrode 124 of transistor 125, and through resistor 126 to ground potential. Transistors 122 and 125 form a differential amplifier. Serially connected resistors 128 and 129, connected from cathode 66 of diode 64 to ground potential, supply a reference voltage for the differential amplifier. Junction 127, between resistors 128 and 129 couples the reference potential to base 130 of transistor 125. Base electrode 131 of transistor 122 is coupled through resistor 132 to one terminal 140 of thermistor 24 in battery 15. The second terminal of thermistor 24 is coupled to ground potential at terminal 78 of battery 15. Should battery 15 not have thermistor 24 present, resistor 132 will remain unterminated. Resistors 133 and 134, connected from cathode 66 of diode 64 to ground potential, supply a reference voltage for the second half of the differential amplifier including transistors 122 and 125. Junction 135 between resistors 133 and 134, couples the reference potential to base 131 of transistor 122.

Override circuit 30 includes a diode 138 with the anode 139 connected to the junction 140 of resistor 132 and thermistor 24. Cathode 141 of diode 148 is connected to push-to-talk switch 29.

Charging rate indicator circuit 20 includes diode 76 previously mentioned. Diode 144 in series with resistor 145 is connected in parallel wit diode 76. Diode 146 and capacitors 147 and 148 are connected in parallel with diode 144. Resistor 149 is connected in parallel with resistor 145. Base electrode 152 of transistor 153 is connected through resistor 154 to cathode 155 of diode 76. Emitter electrode 156 of transistor 153 is connected to anode 157 of diode 76, and collector electrode 158 is connected through resistor 159 to base electrode 160 of transistor 161. Emitter electrode 162 of transistor 161 is coupled to ground potential and collector electrode 163 is coupled to one terminal of an indicator light 164. The other terminal of the indicator light 164 is coupled to a source of potential, as for example to inductor 34.

In operation, switch 11 is closed, supplying battery voltage from battery 10 to astable multivibrator 13. Astable multivibrator 13 is a free-running astable which develops a 25 Khz square wave signal at collector 41 of transistor 38. The square wave signal is amplified by Darlington transistors 46 and 52 and coupled to base electrode 58 of transistor 59 in inverter 14. The Darlington transistors act to prevent loading of multivibrator 13 by transistor 59 and provide sufficient current gain to operate transistor 59. The square wave signal causes transistor 59 to switch on and off which in turn causes a voltage to be developed across inductor 62 as a result of the inductor's characteristic for attempting to continue current flow at the same rate. The voltage developed at inductor 62 is rectified by diode 64 causing capacitor 65 to charge to the necessary charging voltage. As previously mentioned, the charging voltage is approximately 24 volts. The charging voltage is coupled through resistor 70 to transistor 72 in dual rate current limiter 19.

Transistor 72 is biased by resistors 70 and 74 and diodes 111 such that it will limit the current passed therethrough to a first maximum charging current. In the embodiment shown the first maximum charging current is approximately 340 milliamperes. When transistor 113 is rendered conductive as will be described in a subsequent portion of this application, transistor 72 is biased by resistors 70 and 74, and the voltage drop from emitter 112 to collector 114 of transistor 113 in series with the voltage drop across diode 116. With this biasing, transistor 72 will limit the maximum current coupled therethrough to a second, lower maximum current. In the embodiment shown, this second, lower maximum charging current is approximately 50 milliamperes.

Starting first with the example of a rapid charge battery containing thermistor 24, when a discharged rapid charge battery is connected to the charging system at terminals 77, 78, and 140, the voltage at collector 75 of transistor 72 is lowered to the terminal voltage 77 of battery 15. A substantial voltage will therefore be developed across transistor 72, causing transistor 72 to supply a very high charging current to battery 15. Assuming battery 15 is at room temperature and thermistor 24 has not heated, the biasing of transistor 72 will consist of resistors 70 and 74 and diode 111 so that a maximum charging current of 340 milliamperes can be supplied to the battery.

As the charging progresses, the charge capacity of the battery will increase causing an increase in the voltage at terminal 77 of battery 15. When charging is sufficient to raise the battery terminal voltage above 18 volts, transistor 81 will begin to conduct because the voltage at emitter 82 has exceeded the voltage reference established at base electrode 87 to zener diode 85, diode 86 and resistor 88. Transistor 81, when conductive, will develop a voltage at collector 83, which is coupled through resistor 89 to base 91 of transistor 92, causing transistor 92 to conduct. Conduction of transistor 92 will shunt a portion of the current coupled to base 58 of transistor 59 to ground potential, thus reducing the drive current to transistor 59. This reduced drive to transistor 59 will cause a reduction in the charging voltage developed across capacitor 65, which in turn will cause a reduction in the charging current coupled through transistor 72 to battery 15.

In the embodiment shown, when the battery voltages reaches approximately 18 volts, the charging current will be reduced to 150 milliamperes, and ultimately will be reduced to a rate of approximately 18 milliamperes. Should a room temperature rapid charge battery be charged, and assuming the battery does not become overheated, the battery will achieve almost its entire charge capacity before the battery terminal voltage exceeds 18 volts. A maximum charging current of approximately 340 milliamperes will therefore have been supplied during almost the entire charging cycle. In this example the charging time is substantially less than that normally required to charge a battery.

If a cold rapid charge battery is charged, its internal impedance is much larger than at room temperature. Thus, the battery may reach the 18 volt terminal voltage substantially sonner than that necessary to provide a full charge capacity of battery 15. Should the maximum charge rate continue after the battery has achieved 18 volts terminal voltage, serious internal damage could be done to the battery due to overcharging. This could result in a substantial reduction in the battery capacity and possible battery explosion. The 18 volt sensing circuit causes a reduction in the charging voltage developed by converter 12, as previously described, which in turn causes a reduction in the maximum charging current coupled to battery 15 such that the 18 volt terminal voltage of the battery will not be exceeded as a result of the continued charging current.

When a warm battery is to be charged, its internal impedance is much less than the internal impedance at room temperature. As a result, a maximum charging current can be supplied to the battery far in excess of that necessary to provide the full charge capacity of the battery, without the battery ever achieving an 18 volt terminal voltage. Should a charging current be supplied to battery 15 in excess of that necessary to restore full charge capacity, there is a likelihood that a secondary chemical reaction can occur which can cause gassing and overheating of the battery 15, and possibly a battery rupture or explosion. Should the battery reach full charge capacity and a maximum charging current continue to be supplied, because the battery terminal voltage has not reached 18 volts, the battery temperature will begin to rise, as mentioned above. The increased temperature will be coupled to thermistor 24 causing its resistance to increase. When the battery temperature reaches approximately 45° centigrade in the embodiment shown, the impedance of thermistor 24, which is in parallel with resistor 134, will be sufficient to increase the voltage at base 131 of transistor 122 sufficiently so that it is higher than the reference voltage at base 130 of transistor 125. The voltage at base 131 will cause transistor 122 to conduct, thus lowering the voltage at collector 121. This reduced voltage is coupled through resistor 119 to base 118 of transistor 113, causing transistor 113 to conduct. With transistor 113 conductive, as noted above, the bias for transistor 72 is provided by resistors 70 and 74, and the voltage drop across transistor 113 and diode 116. This bias voltage will limit the maximum charging current conducted by transistor 72 to approximately 50 milliamperes. A maximum charging current of approximately 50 milliamperes will not cause a further temperature increase or gassing in battery 15 when the battery terminal voltage is below 18 volts.

When a non-rapid charge battery 15 is connected to the charging system, there is no thermistor 14. The impedance at junction 140 is therefore infinite. The voltage developed at base 131 of transistor 122 is therefore dependent upon the resistant divider consisting of resistor 133 and 134. This voltage will be greater than the reference voltage at base 130 at transistor 125, causing transistor 122 and therefore 113 to be maintained at a conductive state. In this state transistor 72 will limit the maximum charging current to battery 15 to approximately 50 milliamperes, thus allowing battery 15 to charge at the slower charging rate. The 50 milliampere charging rate will be reduced when battery 15 exceeds an 18 volt terminal voltage, and will ultimately be reduced to a rate of approximately 18 milliamperes, which is considered a trickle charge rate. The trickle charge rate cannot damage the battery, but only maintain its full charge capacity.

When a non-rapid charge battery is being charged, or when a rapid charge battery is being charged wherein the temperature has exceeded 45 degrees centigrade, transistor 72 will limit the maximum charging current to the second, lower maximum charging current of approximately 50 milliamperes. If the battery terminal voltage is below 18 volts, transistors 81 and 92 will not be operative to reduce the voltage developed by converter 12 so that the voltage developed across capacitor 65 can exceed 24 volts. 24 volts across capacitor 65 is sufficient to provide maximum charge current to battery 15. If the voltage rises above 24 volts the excess voltage will cause inefficient operation of transistors 59 and 72. The inefficient operation will result in the heating and overdissipation of transistors 59 and 72. In order to prevent this overdissipation, a 24 volts voltage sensing circuit 28 is provided. When the voltage developed across capacitor 65 exceeds 24 volts transistor 96 is rendered conductive because the voltage at emitter 97 has exceeded the voltage reference established at base electrode 99 by zener diode 98 and resistor 100. Transistor 96, when conductive, will develop a voltage at collector 101 which is coupled through resistor 102 to base electrode 105 of transistor 106 causing transistor 106 to conduct. With transistor 106 conductive, a portion of the signal developed at base 58 of transistor 59 is shunted to ground through collector 108 and emitter 109 of transistor 106. This will cause a reduction in the voltage developed across capacitor 65. The voltage across capacitor 65 will therefore be maintained at 24 volts.

As previously stated, battery 15 may be charged while still connected to the current consuming equipment to be operated such as the portable transceiver 21 shown in FIG. 1. If battery 15 is being charged at the second, lower maximum charging current rate of 50 milliamperes, operation of portable transceiver 21 can cause a reduction in the charge capacity of battery 15. Override circuit 30 prevents this occurrence. Actuation of portable transceiver 21 as for example, by a push-to-talk switch 29 will cause cathode 141 of diode 138 to be connected to ground potential. This will cause a reduction in the voltage developed at base 131 of transistor 122, causing transistors 122 and 113 to be rendered conductive. Transistor 72 will then be biased to provide the first higher maximum charging current of approximately 340 milliamperes. Operation of portable transceiver 21 will also place a load across battery 15 such that its terminal voltage will be reduced below 18 volts. This will prevent the operation of 18 voltage sensing circuit 27. The maximum higher charging current of approximately 340 milliamperes will therefore be supplied to portable transceiver 21.

When a current in excess of 50 milliamperes is being supplied to battery 15, the voltage developed across diode 76 in indicator circuit 30 will render transistor 153 conductive which in turn renders transistor 161 conductive. With transistor 161 conductive, a ground potential is supplied to one terminal of light 164 causing the light to turn on and indicate the battery 15 is being charged at a higher charging rate.

As can be seen, an automatic battery charging system has been provided which is capable of charging all batteries to their full charge capacity, and rapid charge batteries to their full charge capacity in a shortened period of time. When charging a rapid charge battery containing a thermistor the system senses battery temperature and terminal voltage and limits the maximum charging current to a safe level in accordance therewith. Furthermore, the battery to be charged may be connected to equipment to be operated and the equipment so connected may be operated and supplied with operating current from the charging system without causing a reduction in charge capacity of the battery.

We claim:

1. An automatic battery charging and voltage regulating system connected between a source of voltage and a battery to be charged which battery may have current consuming equipment connected thereto, and may have temperature responsive means attached thereon having a first state in response to a battery temperature below a first level and a second state in response to a battery temperature above said first level, said system including in combination, converter means coupled to said source of voltage for developing a charging voltage therefrom for charging said battery, current control means coupled to said converter means and said battery and operative in response to said charging voltage to supply a charging current to said battery, said current control means being operative to limit said charging current to a first maximum charging current in response to a first control signal coupled thereto, and to a second maximum charging current in response to a second control signal, control circuit means coupled to said current control means and said battery, said control circuit means being operative to develop said first control signal in response to said temperature responsive means having said first state, said control circuit means being further operative to develop said second control signal in response to the absence of said temperature responsive means and in response to said temperature responsive means having said second state, voltage sensing means coupled to said battery and said converter means and operative in response to a battery voltage in excess of a first level to provide a signal to said convertor means to reduce the charging voltage whereby said first or second maximum charging current to said battery is reduced.

2. The system of claim 1 wherein said current control means includes a transistor current limiter.

3. The system of claim 2 wherein said temperature responsive means is a temperature variable resistance means having a resistance less than a first resistance in response to a battery temperature below said first level and a resistance greater than said first resistance in response to a battery temperature above said first level.

4. The system of claim 3 wherein said temperature variable resistance means is a thermistor.

5. A system of claim 4 wherein said control circuit means includes comparison means coupled to said battery and operative to develop a first comparison signal in response to said thermistor having said first state, said comparison means being further operative to develop a second comparison signal in response to the absence of said thermistor and to said thermistor having said second state.

6. The system of claim 5 wherein said comparison means includes first circuit means coupled to said battery, said first circuit means operative to develop a voltage signal above a first voltage in the absence of said thermistor and in response to said thermistor having said second state, and a voltage signal below said first voltage in response to said thermistor having said first state, second circuit means for developing said first voltage, differential amplifier means coupled to said first and second circuit means and responsive to said voltage signal being below said first voltage to develop said first comparison signal and to said voltage signal being above said first voltage to develop said second comparison signal.

7. The system of claim 6 wherein said transistor current limiter includes a transistor having base, emitter and collector electrodes, said emitter electrode being coupled to said converter means, said collector electrode being coupled to said battery, said control circuit means further including third circuit means coupled between said current limiter base and emitter electrodes, said third circuit means operative in response to said first comparison signal to develop said first control signal thereacross for limiting conduction of said transistor current limiter to said first maximum charging current, and operative in response to said second comparison signal to develop said second control signal thereacross for limiting conduction of said transistor current limiter to said second maximum charging current.

8. The system of claim 7 further including fourth circuit means coupled to said first circuit means and to said current consuming equipment and operative in response to operation of said equipment to maintain said voltage signal below said first voltage whereby said transistor current limiter is operative to supply said first maximum charging current.

9. The system of claim 8 wherein said fourth circuit includes diode means coupled to said first circuit means and said equipment.

10. The system of claim 9 wherein said third circuit means includes first diode means coupled from said transistor current limiter base electrode to said emitter electrode, transistor switch means having first and second principle electrodes and a control electrode, diode means coupled in series with said switch means principle electrodes, said series combination being coupled in parallel with said first diode means, said control electrode being coupled to said differential amplifier means, said switch means being responsive to said first comparison signal to be maintained in a first state whereby said first control signal is developed across said third circuit and to said second comparison signal to be maintained in said second state whereby said second control signal is developed across said third circuit.

11. An automatic battery charging and voltage regulating system connectable between a source of voltage and a battery to be charged which battery may have current consuming equipment connected thereto and temperature variable resistance means attached thereon having a first state wherein said resistance is less than a first resistance in response to a battery temperature below a first level, and a second state wherein said resistance is greater than said first resistance in response to a battery temperature above said first level, said system including in combination, converter means coupled to said source of voltage for developing a charging voltage therefrom for charging said battery, current control means coupled to said converter means and said battery and operative in response to said charging voltage to supply a charging current to said battery, said current control means limiting said charging current to a first maximum charging current in response to a first control signal coupled thereto and to a second, lower maximum charging current in response to a second control signal, control circuit means coupled to said current control means and said battery, said control circuit means being operative to develop said first control signal in response to said temperature variable resistance means having said first state, said control circuit means being further operative to develop said second control signal in response to the absence of said temperature variable resistance means and to said temperature variable resistance means having said second state, first voltage sensing means coupled to said battery and said converter means and operative in response to a battery voltage in excess of a second level to reduce the charging voltage of said converter means whereby said charging current to said battery is reduced, and first circuit means coupled to said control circuit means and said equipment and operative in response to operation of said equipment to cause said control circuit means to develop said first control signal whereby said current control means is operative to supply said first maximum charging current.

12. The system of claim 11 further including second voltage sensing means coupled to said converter means and responsive to a charging voltage in excess of a third level to reduce the charging voltage developed thereby whereby said charging current to said battery is reduced.

13. The system of claim 12 wherein said first circuit means includes diode means coupled to said control circuit means and said equipment.

14. The system of claim 13 wherein said first voltage sensing means includes voltage reference means for developing a reference voltage, transistor means coupled to said voltage reference means said battery and said converter means, said transistor means operative in response to said battery voltage exceeding said voltage reference to reduce the charging voltage of said converter means.

15. The system of claim 14 wherein said second voltage sensing means includes second voltage reference means for developing a second reference voltage, second transistor means coupled to said second voltage reference means and to said converter means, said second transistor means operative in response to said charging voltage exceeding said second reference voltage to reduce the charging voltage of said converter means.

16. The system of claim 15 wherein said control circuit means includes comparison means coupled to said battery and operative to develop a first comparison signal in response to said temperature variable resistance means having said first state, said comparison means being further operative to develop a second comparison signal in response to the absence of said temperature variable resistance means and to said temperature variable resistance means having said second state.

17. The system of claim 16 wherein said comparison means includes second circuit means coupled to said battery, said second circuit means operative to develop a voltage signal above a first voltage in the absence of said temperature variable resistance means and in response to said temperature variable resistance means having said second state, and a voltage signal below said first voltage in response to said temperature variable resistance means have said first state, third circuit means for developing said first voltage, differential amplifier means coupled to said second and third circuit means and responsive to said voltage signal being below said first voltage to develop said first comparison signal and to said voltage signal being above said first voltage to develop said second comparison signal.

18. The system of claim 17 wherein said current control means includes a transistor current limiter having base, emitter and collector electrodes, said emitter electrode being coupled to said converter means, said collector electrode being coupled to said battery, said control circuit means further including fourth circuit means coupled between said current limiter base and emitter electrodes, said fourth circuit means operative in response to said first comparison signal to develop said first control signal thereacross for limiting conduction of said transistor current limiter to said first maximum charging current, and operative in response to said second comparison signal to develop said second control signal thereacross for limiting conduction of said transistor current limiter to said second lower maximum charging current.

19. The system of claim 18 wherein said fourth circuit means includes, first diode means coupled from said transistor current limiter base electrode to said emitter electrode, transistor switch means having first and second principle electrodes and a control electrode, diode means coupled in series with said principle electrodes, said series combination being coupled in parallel with said first diode means, said control electrode being coupled to said differential amplifier means, said transistor switch means being responsive to said first comparison signal to be maintained in a first state whereby said first control signal is developed across said fourth circuit means and responsive to said second comparison signal to be maintained in a second state whereby said second control signal is developed across said fourth circuit means.

20. The system of claim 19 wherein said converter means includes astable multivibrator means coupled to said source of voltage and operative to switch between a first and second state, and inverter means coupled to said source of voltage to said astable multivibrator means and to said current control means, said inverter means operative in response to said astable multivibrator means changing from a first to a second state to develop said charging voltage.

21. The system of claim 20 further including indicator means coupled between said current control means collector electrode and said battery, said indicator means being operative to indicate when said charging current is above and below said second lower maximum charging current.

* * * * *